(12) United States Patent
Ban et al.

(10) Patent No.: US 9,648,660 B2
(45) Date of Patent: May 9, 2017

(54) TRACKING AREA MANAGEMENT

(71) Applicant: KT CORPORATION, Gyeonggi-do (KR)

(72) Inventors: Tae-Won Ban, Gyeonggi-do (KR);
Young-Han Kim, Seoul (KR);
Chang-Yong Ahn, Gyeonggi-do (KR);
Hyun-Beom Lee, Seoul (KR);
Byoung-Jin Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 155 days.

(21) Appl. No.: 13/919,057

(22) Filed: Jun. 17, 2013

(65) Prior Publication Data

US 2013/0337797 A1 Dec. 19, 2013

(30) Foreign Application Priority Data

Jun. 18, 2012 (KR) ........................ 10-2012-0065029

(51) Int. Cl.
*H04W 4/00* (2009.01)
*H04W 84/00* (2009.01)
(Continued)

(52) U.S. Cl.
CPC ........... *H04W 84/00* (2013.01); *H04W 60/00* (2013.01); *H04W 84/045* (2013.01)

(58) Field of Classification Search
CPC ........... H04W 4/00; H04W 4/04; H04W 8/02;
H04W 8/04; H04W 8/06; H04W 8/10;
H04W 8/12; H04W 8/14; H04W 8/18;
H04W 8/20; H04W 8/22; H04W 8/24;
H04W 8/26; H04W 16/08; H04W 16/16;
H04W 36/00; H04W 36/02; H04W 36/06;
H04W 36/08; H04W 36/10; H04W 36/12;
(Continued)

(56) References Cited

U.S. PATENT DOCUMENTS 7,145,890 B1  12/2006  Seo et al.
7,596,181 B2   9/2009  Chang et al.
(Continued)

FOREIGN PATENT DOCUMENTS

JP  2009-077368 A  4/2009
JP  2011-087294 A  4/2011
(Continued)

OTHER PUBLICATIONS

Poongup Lee et al., "Physical Cell Identity Reservation for 3GPP LTE Femtocell", School of Information and Communication Engineering, Sungkyunkwan University, Suwon-si, Republic of Korea.

*Primary Examiner* — Marcos Batista
(74) *Attorney, Agent, or Firm* — IP Legal Services, LLC

(57) ABSTRACT

The disclosure is related tracking area management in a femtocell network. A mobility management entity may receive, from a femtocell base station, macrocell tracking area information associated with the femtocell base station. The mobility management entity may combine the received macrocell tracking area information with femtocell tracking area information associated with the femtocell base station and storing the combined tracking area information as integrated tracking area information.

13 Claims, 4 Drawing Sheets

(51) Int. Cl.
*H04W 60/00* (2009.01)
*H04W 84/04* (2009.01)

(58) Field of Classification Search
CPC ..... H04W 36/14; H04W 36/16; H04W 36/18;
H04W 36/24; H04W 36/26; H04W 36/38;
H04W 36/30
USPC ............... 455/422.1, 436, 437, 444, 449
See application file for complete search history.

(56) References Cited

U.S. PATENT DOCUMENTS

| | | | |
|---|---|---|---|
| 8,248,911 B2 | 8/2012 | Kim et al. | |
| 8,565,793 B1* | 10/2013 | Koodli | H04W 68/04 370/329 |
| 2006/0013325 A1 | 1/2006 | Agrawal et al. | |
| 2007/0097938 A1 | 5/2007 | Nylander et al. | |
| 2007/0254620 A1 | 11/2007 | Lindqvist et al. | |
| 2008/0146226 A1 | 6/2008 | Claussen et al. | |
| 2009/0181672 A1 | 7/2009 | Horn et al. | |
| 2009/0182871 A1 | 7/2009 | Gupta et al. | |
| 2009/0239533 A1 | 9/2009 | Somasundaram et al. | |
| 2009/0290502 A1* | 11/2009 | Tinnakornsrisuphap et al. | 370/252 |
| 2009/0290652 A1 | 11/2009 | Rezaiifar et al. | |
| 2010/0069062 A1 | 3/2010 | Horn et al. | |
| 2010/0124179 A1* | 5/2010 | Lee et al. | 370/252 |
| 2010/0210288 A1 | 8/2010 | Kim et al. | |
| 2010/0227627 A1* | 9/2010 | Ishii et al. | 455/456.2 |
| 2011/0014920 A1 | 1/2011 | Nylander et al. | |
| 2011/0143755 A1 | 6/2011 | Islam et al. | |
| 2011/0149771 A1 | 6/2011 | Abeta et al. | |
| 2011/0151878 A1* | 6/2011 | Xu et al. | 455/444 |
| 2011/0165878 A1* | 7/2011 | Nylander et al. | 455/436 |
| 2011/0190010 A1 | 8/2011 | Cho | |
| 2011/0237251 A1* | 9/2011 | Chow | H04W 68/08 455/434 |
| 2011/0300870 A1 | 12/2011 | Chun et al. | |
| 2012/0039226 A1 | 2/2012 | Yang et al. | |
| 2013/0244718 A1* | 9/2013 | Lee et al. | 455/525 |

FOREIGN PATENT DOCUMENTS

| | | |
|---|---|---|
| KR | 10-2001-0017137 A | 3/2001 |
| KR | 10-2006-0051391 A | 5/2006 |
| KR | 10-2007-0050339 A | 5/2007 |
| KR | 10-2008-0085321 A | 9/2008 |
| KR | 10-2009-0099058 A | 9/2009 |
| KR | 10-2010-0009932 A | 1/2010 |
| KR | 10-2010-0016881 A | 2/2010 |
| KR | 10-2010-0018309 A | 2/2010 |
| KR | 10-2010-0046492 A | 5/2010 |
| KR | 10-2010-0092855 A | 8/2010 |
| KR | 10-2010-0096015 A | 9/2010 |
| KR | 10-2010-0123078 A | 11/2010 |
| KR | 10-2010-0129315 A | 12/2010 |
| KR | 10-2010-0132845 A | 12/2010 |
| KR | 10-2011-0010121 A | 1/2011 |
| KR | 10-2011-0088673 A | 8/2011 |
| KR | 10-2012-0034217 A | 4/2012 |

* cited by examiner

| TAL | TAI(MCC/MNC/TAC) | |
|---|---|---|
| 1 | 450/08/H'0001 | 450/08/H'0002 |
| 2 | 450/08/H'0002 | 450/08/H'0003 |
| ⋮ | ⋮ | |

| TAL | Femtocell TAI(MCC/MNC/TAC) | | Macrocell Tracking TAI(MCC/MNC/TAC) | | |
|---|---|---|---|---|---|
| 1 | 450/08/H'0001 | 450/08/H'0002 | 450/08/M'0001 | 450/08/M'0002 | 450/08/M'0003 |
| 2 | 450/08/H'0002 | 450/08/H'0003 | 450/08/M'0002 | 450/08/M'0003 | |
| ⋮ | ⋮ | | ⋮ | | |

TRACKING AREA MANAGEMENT

CROSS REFERENCE TO PRIOR APPLICATIONS

The present application claims priority under 35 U.S.C. §119 to Korean Patent Application No. 10-2012-0065029 (filed on Jun. 18, 2012), which is hereby incorporated by reference in its entirety.

The subject matter of this application is related to U.S. patent application Ser. No. 13/553,160 filed on Jul. 19, 2012, the teachings of which are incorporated herein their entity by reference.

BACKGROUND

The present disclosure relates to communications, more particularly, to tracking area list management in a long term evolution (LTE) femtocell network.

The next generation wireless mobile communication system requirements include stable support of multimedia service as well as a voice/data service. For example, $3^{rd}$ generation partnership project (3GPP) long term evolution (LTE) has been designed to guarantee a high quality service at a high data transmit rate, such as, about 100 Mbps as a downlink data transmit rate and about 50 Mpbs as an uplink data transmit rate. Such a signal quality and a data transmit rate of a LTE network generally deteriorate in an indoor place such as home, office, and building because of obstacles such as walls, windows, and even furniture. According to statistics, demand of about 40% of voice services and about 70% of data services are at indoor places in a 3 G communication network. Therefore, research has been made to improve a data transmit rate and a signal quality of a wireless communication service demanding in the indoor places.

For improving the data transmit rate and the signal quality in the indoor places, a femtocell has been introduced. The femtocell may be a base station for an indoor location. The femtocell connects a user equipment to a core network through a broadband network (i.e., Internet network) installed in indoor places. Such a femtocell is generally installed in a shadow area for expanding a service area. Further, such femtocell can be easily installed a desired location through a provided plug and play scheme. Accordingly, the femtocell may be a solution for improving the communication service quality with a low cost.

In order to manage user equipments located in a femtocell, a mobility management entity may be required to track locations of user equipments in the femtocell. In order to track the locations of user equipments, femtocells are managed based on cells and tracking areas (TAs). Particularly, a location of a user equipment in an active mode may be determined based on cells. However, location of a user equipment in an idle mode might not necessarily be easily determined based on tracking areas (TA). A related communication service provider may optimally set such tracking areas in consideration of various factors including location registration load, a paging success rate, and paging load.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, tracking area list management in a femtocell network may be performed based on overlapped macrocell tracking areas in addition to femtocell tracking areas associated with registered user equipments.

In accordance with another aspect of the present embodiment, a paging procedure may be performed based on an integrated tracking area list created by combining information on macrocell tracking areas overlapping femtocell tracking areas related to the target user equipment with information on the femtocell tracking areas.

In accordance with at least one embodiment, a method may be provided for tracking area management in a femtocell network at a mobility management entity. The method may include receiving, from a femtocell base station, macrocell tracking area information associated with the femtocell base station, combining the received macrocell tracking area information with femtocell tracking area information associated with the femtocell base station, and storing and managing the combined tracking area information as integrated tracking area information.

The macrocell tracking area information may be information on macrocell tracking areas overlapping femtocell tracking areas of the femtocell base station. The macrocell tracking area information may include tracking area identities of macrocell tracking areas associated with the femtocell base station.

The combining may include extracting, from the received macrocell tracking area information, at least one tracking area identity of a macrocell tracking area overlapping a femtocell tracking area of the femtocell base station, adding the extracted at least one tracking area identity of the overlapped macrocell tracking area into a tracking area list associated with the femtocell base station, and storing the tracking area list with the tracking area identity of the overlapped macrocell tracking area as an integrated tracking area list.

In accordance with another embodiment, a method may be provided for tracking area list management in a femtocell network at a mobility management entity. The method may include receiving, from a femtocell base station, information on at least one neighbor macrocell base station in vicinity of the femtocell base station, obtaining macrocell tracking area information based on the received information of at least one neighbor macrocell base station, retrieving femtocell tracking area information of the femtocell base station, and generating integrated tracking area information by combining the obtained macrocell tracking area information with the retrieved femtocell tracking area information.

The obtaining may include extracting a physical cell identity (PCI) of the at least one neighbor macrocell base station from the received information and obtaining a tracking area identity of a macrocell tracking area associated with the at least one neighbor macrocell base station based on the extracted PCI.

The retrieving may include obtaining at least one femtocell tracking area list based on the retrieved femtocell tracking area information of the femtocell base station, where the at least one femtocell tracking area list includes tracking area identities of femtocell tracking areas that a corresponding user equipment has visited or currently located. In this case, the generating may include adding the obtained tracking area identity of the macrocell tracking area into the obtained at least one femtocell tracking area list and storing the at least one femtocell tracking area list with the obtained tracking area identity added as the integrated tracking area list.

In accordance with still another embodiment, a mobility management entity may include a receiver and a tracking area management unit. The receiver may be configured to receive, from a femtocell base station, macrocell information associated with femtocell base station. The tracking area management unit may be configured to generate integrated tracking area information by combining the received macrocell information with femtocell information associated with the femtocell base station for tracking area management in a femtocell network.

The tracking area management unit may be configured to extract, from the received macrocell information, at least one tracking area identity of a macrocell tracking area overlapping a femtocell tracking area of the femtocell base station, to add the extracted at least one tracking area identity of the overlapped macrocell tracking area into a tracking area list associated with the femtocell base station, and to store the tracking area list with the tracking area identity of the overlapped macrocell tracking area as an integrated tracking area list.

In another embodiment, the tracking area management may be configured to extract a physical cell identity (PCI) of at least one neighbor macrocell base station from the received macrocell information, to obtain a tracking area identity of a macrocell tracking area associated with the at least one neighbor macrocell base station based on the extracted PCI, to retrieve femtocell tracking area information of the femtocell base station, to obtain at least one femtocell tracking area list based on the retrieved femtocell tracking area information of the femtocell base station, where the at least one femtocell tracking area list includes tracking area identities of femtocell tracking areas that a corresponding user equipment has visited or currently located, and to add the obtained tracking area identity of the macrocell tracking area into the obtained at least one femtocell tracking area list as the integrated tracking area list.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figures 1, 2:
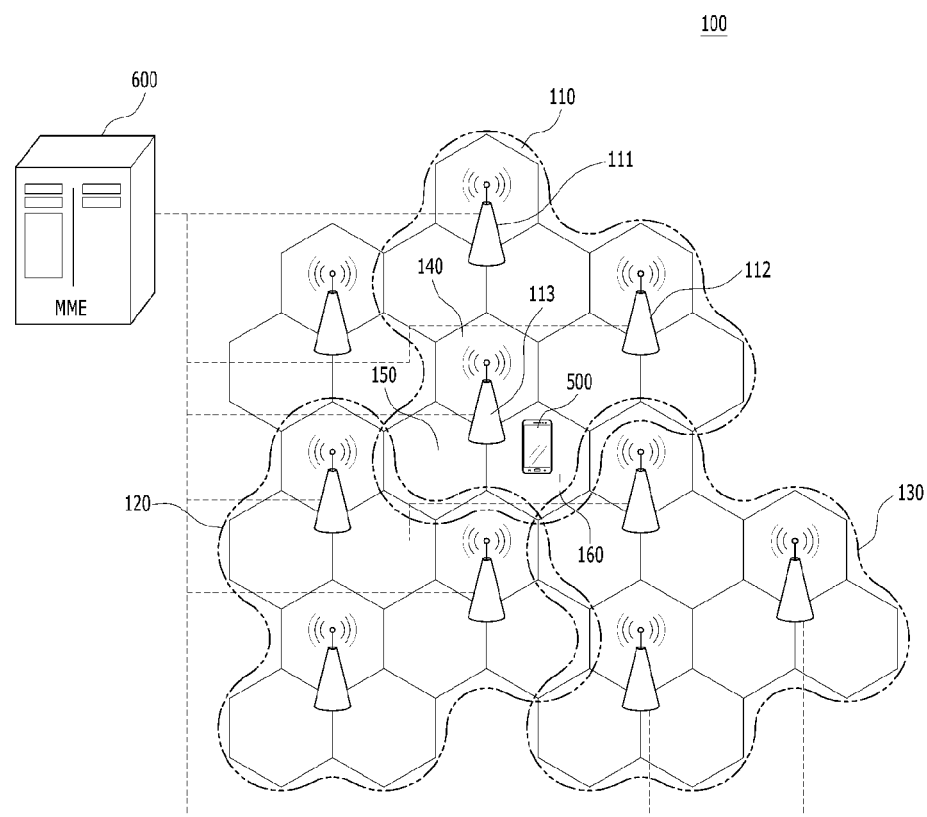
FIG. 1 illustrates cells and tracking areas of a femtocell network.
FIG. 2 shows information on tracking area lists each associated with respective user equipment and stored and managed by a mobility management entity.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, tracking area list management in a femtocell network may be performed based on overlapped macrocell tracking areas in addition to femtocell tracking areas associated with registered user equipments. For example, a mobile management entity in a femtocell network obtains and maintains information on macrocell tracking areas that overlap femtocell tracking areas related to registered user equipments. The mobile management entity may additionally use the information on the macrocell tracking areas for the tracking area list management in the femtocell network.

Hereinafter, tracking area list management in accordance with at least one embodiment will be described with the accompanying drawings. For convenience and ease of understanding, the tracking area list management will be described as being applied to a long term evolution (LTE) femtocell network. The present invention, however, is not limited thereto. The tracking area list management in accordance with at least one embodiment will be similarly applied to other communication networks including 3rd generation partnership project (3GPP) femtocell network. Before describing the tracking area list management in accordance with at least one embodiment, typical tracking area management in an LTE femtocell network will be described in reference with FIG. 1.

FIG. 1 illustrates cells and tracking areas of a femtocell network.

Referring to FIG. 1, femtocell network 100 includes a plurality of femtocell base stations (i.e., femtocell base stations 111 to 113). Each femtocell base station forms a service area and provides related services to subscribers through user equipments located within the corresponding service area. Such a femtocell base station may be generally installed at indoor places such as home, office, or building. The femtocell base station is coupled to a core network through a public network such as a digital subscriber line (DSL) or an Ethernet. That is, the femtocell base station connects subscriber's user equipment to a core network and enables the subscribers to use a communication service provided through the core network. Such femtocell base station may be referred to as a microcell base station, a picocell base station, and an ubicell base station. Furthermore, the femtocell base station may be referred to as Home Node B (HNB) for 3GPP's term for a $3^{rd}$ generation (3G) femtocell and as a home eNodeB (HeNB) for LTE's term for a $4^{th}$ generation (4G) femtocell.

As described, the femtocell base stations may be coupled to user equipment. For example, user equipment 500 may access femtocell base station 113 and be coupled to the core network through accessed femtocell base station 113. For example, such user equipment 500 may establish a bearer to femtocell base station 113 and communicate femtocell base station 113 through the established bearer in order to enable a corresponding user to receive a communication service such as a voice service and a data service.

That is, user equipment 500 may be a device that allows a user to access a network to have related services including voice and packet communication services in a mobile communication network. User equipment 500 may be referred to as a mobile station (MS), a user terminal (UT), a subscriber station (SS), and so forth. Particularly, user equipment may include feature phones such as a cellular phone, a personal communication service (PCS) phone, a global system for mobile communication (GSM) phone, a code division multiple access (CDMA)-2000 phone, a wideband code division multiple access (WCDMA) phone, a smart phone, a tablet personal computer (PC), a pad-type device, and a mobile phone for fourth generation (4G) network.

As shown in FIG. 1, a plurality of femtocell base stations 111 to 113 are coupled to mobile management entity (MME) 600. Mobility management entity 600 may be a key control node for a LTE access network. Mobility management entity 600 may perform tracking and paging procedure including retransmission. Particularly, mobility management entity 600 may track a location of a user equipment in an idle mode using tracking area lists associated with the user equipment. Furthermore, mobility management entity 600 communicates with a home subscriber server (HSS) for user authentication and user profile download and provides evolved packet system (EPS) mobility management and EPS session management through non access stratum (NAS) signaling.

As shown in FIG. 1, femtocell network 100 may be divided into cells (i.e., cells 140 to 160) and/or tracking areas (i.e., tracking areas 110 to 130) for various purposes. For example, cells 140 to 160 may be used for tracing locations of user equipments in an active mode and tracking areas 110 to 130 may be used for tracking locations of user equipments in an idle mode.

Each femtocell base station (i.e., femtocell base stations in tracking areas 110 to 130) may include three cells. For example, femtocell base station 113 includes three cells 140, 150, and 160. That is, a service area of a femtocell base station may be divided into three cells. The present invention, however, is not limited thereto. One tracking area may include service areas of three femtocell base stations. For example, tracking area 110 includes service areas of three femtocell base stations 111, 112, and 113. That is, three femtocell base stations 111, 112, and 113 are installed in one tracking area 110. Accordingly, one tracking area 110 includes nine cells, but the present invention is not limited thereto. The present invention, however, is not limited to the number of cells managed by one femtocell base station and the number of femtocell base stations in one tracking area, described above. Such numbers may be changed by an operator, a related service provider, or a designer of a network in consideration of various factors.

As described, a tracking area in LTE femtocell network 100 is defined as a group of adjacent multiple cells, for example nine cells. Such tracking area in LTE femtocell network 100 will be referred to as a femtocell tracking area, hereinafter. Each femtocell tracking area may be assigned with a unique tracking area identity. Accordingly, each tracking area may be identified based on such a tracking area identity, particularly by mobility management entity 600.

The femtocell tracking areas in femtocell network 100 may be managed by mobility management entity 600. For example, mobility management entity 600 may store lists of femtocell tracking areas associated to registered user equipments. Such lists may be referred to as tracking area lists (TAL). Mobility management entity 600 may obtain information on a femtocell tracking area from user equipment (i.e., user equipment 500). For example, mobility management entity 600 may regularly receive information on tracking areas associated with user equipment 500 and update a femtocell tracking area list associated with user equipment 500 based on the received information. Furthermore, mobility management entity 600 may receive information on a new tracking area when user equipment 500 enters the new tracking area which is not included in the tracking area list associated with user equipment 500. Mobility management entity 600 may store and manage such tracking area lists in order to find a location of user equipment when the user equipment is in an idle mode.

When a user equipment is activated and coupled to a LTE network, an EPS bearer is established in an end-to-end manner between the user equipment and a network such as packet data network gateway (P-GW). Through the EPS bearer, mobility management entity 600 is aware of which cell user equipment is located in. Therefore, data traffic can be immediately delivered from the network to the corresponding user equipment in an active mode.

However, when user equipment is in an idle mode, an EPS bearer and a signaling connection established between the user equipment and the network are disconnected or released. Accordingly, mobility management entity 600 cannot be aware of which cell the user equipment in the idle mode is located at after the bearer or the signaling connection has been disconnected or released. When there is data traffic generated and required to be delivered to the user equipment in the idle mode, it requires informing the user equipment in the idle mode of such generation of data traffic. That is, a network may need to track down a location of the user equipment although the user equipment is in the idle state. In order to trace such user equipment in the idle mode, the tracking area list may be used.

Information on the tracking areas in the femtocell network (i.e., femtocell tracking areas) may be obtained as follows. Mobility management entity 600 regularly receives from a user equipment information on a tracking area where the user equipment is located. Furthermore, mobility management entity 600 may receive information on a tracking area when the user equipment enters a new tracking area. Mobility management entity 600 may store and maintain such received information. The information on a tracking area may include a tracking area identity (TAI) of the tracking area.

Femtocell base stations (i.e., femtocell base stations 111 to 113) regularly or frequently broadcast associated tracking area identities. User equipments coupled to the femtocell base stations receive the tracking area identities and regularly provide the tracking area identities to mobility management entity 600 as described above. Mobility management entity 600 obtains tracking area identities from registered user equipments, updates tracking area lists each associated with respective user equipment based on the received tracking area identities, and maintains the updated tracking area lists.

When data traffic is generated to be delivered to user equipments in an idle mode, mobility management entity 600 may perform a paging procedure for finding the user equipments in the idle mode and identifying such generation of data traffic to the user equipments. Such paging procedure may be performed based on the tracking area information. That is, the paging procedure may be performed based on the latest tracking area reported by a target user equipment to find or based on the tracking area lists updated in association with registered user equipments. For example, mobility management entity 600 may transmit a paging message to cells included in the latest tracking area reported by a target user equipment to be informed. Alternatively, mobility management entity 600 may transmit a paging message to cells of tracking areas included in the tracking area list associated with the user equipment to be informed.

When a user equipment is registered at a network, mobility management entity 600 may allocate a tracking area list and a tracking area update timer to the registered user equipment. As described, the tracking area list may be a group of tracking areas where the user equipment is currently located or has visited. The user equipment regularly reports mobility management entity 600 with information on a current tracking area where the user equipment is currently located at when a tracking area update timer elapses. Furthermore, the user equipment provides mobility management entity 600 with information on a tracking area, such as a tracking area identity, when the user equipment moves into a new tracking area that is excluded in the associated tracking area list. Such operation may be referred to as a tracking area update (TAU) operation.

For example, when user equipment 500 registers mobility management entity 600, mobility management entity 600 may allocate a tracking area update timer and a first tracking area list including an identities of first tracking area 110 and second tracking area 120. User equipment 500 may regularly provide a tracking area identity of a tracking area where user equipment 500 is currently located when the allocated tracking area update timer is elapsed. When user equipment moves from first tracking area 110 to second tracking area 120, user equipment 500 may not report mobility management entity 600 with the tracking area identity of second tracking area 120 because the first tracking area list already includes the tracking area identity of second tracking area 120. However, when user equipment 500 moves from first tracking area 110 to third tracking area 130, user equipment 500 reports a tracking area identity of third tracking area 130 because the first tracking area list does not include the tracking area identity of third tracking area 130.

Particularly, when user equipment 500 enters third tracking area 130 from first tracking area 110 such a tracking area update operation may be performed as follows. User equipment 500 transmits a tracking area update (TAU) request message to mobility management entity 600 when user equipment 500 moves into a new tracking area, for example, third tracking area 130 or when a tracking area update timer elapses. The TAU request message may include information on the last visited tracking area and the current tracking area. For example, the TAU request message may be configured to have parameters or tags set as "TAI=TA3" and/or "Last Visited=TA1." That is, user equipment 500 is currently located in third tracking area (TA3) 130 and previously located in first tracking area (TA1) 110. Mobility management entity 600 may update a current tracking area associated with user equipment 500 from first tracking area 110 to third tracking area 130. Alternatively, mobility management entity 600 may add third tracking area 130 into a tracking area list associated with user equipment 500. Then, mobility management entity 600 may transmit a TAU accept message to user equipment 500. Mobility management entity 600 may also provide an updated tracking area list including third tracking area 130 to user equipment 500. As described above, user equipment 500 may perform a tracking area update operation when user equipment 500 enters a new tracking area or when a TAU timer is elapsed.

Since mobility management entity 600 transmits a paging message to cells based on a tracking area list associated with a target user equipment in an idle mode, a size of a tracking area may affect performance of finding the target user equipment, such as a search time and a success rate. For example, the bigger a size of a tracking area is, the higher a probability of finding a target user equipment becomes. However, signal load will be generated due to a paging procedure and will increase in proportion to a size of a tracking area or the number of tracking areas in a tracking area list. Accordingly, a wireless communication service provider determines a relatively optimal size of a tracking area in consideration of various factors.

FIG. 2 shows information on tracking area lists each associated with respective user equipment and stored and managed by a mobility management entity.

Referring to FIG. 2, mobility management entity 600 may store and update information on tracking area lists of respective user equipments. Hereinafter, the information on tracking area list (TAL) is referred to as TAL information. Table 200 of FIG. 2 may be TAL information stored and managed by mobility management entity 600. As shown, TAL information may include a plurality of tracking area lists each associated with respective user equipments that are registered at MME 200.

For example, table 200 of FIG. 2 is illustrated as including two tracking area lists 210 and 220, but the present invention is not limited thereto. First and second tracking area lists 210 and 220 may be associated with two user equipments, respectively. Each one of tracking area lists 210 and 220 may include tracking area identities of tracking areas that are associated with a user equipment. That is, each tracking area list includes tracking area identities of tracking areas that the associated user equipment has visited and currently located in. For example, first tracking area list 210 may be associated to user equipment 500 and include tracking area identities that user equipment 500 has visited and currently located. First tracking area list 210 may include tracking area identities of first tracking area 100 and second tracking area 110.

As shown in table 200 of FIG. 2, the tracking area identity of first tracking area 110 is "450/08/H'0001" and the tracking area identity of second tracking area 120 is "450/08/H'0002." The tracking area identity may be generated as combination of a mobile country code (MCC), a mobile network code (MNC), and a tracking area code (TAC). The mobile country code may be a code for identifying a country. The mobile network code may be a code for identifying a communication service provider. The tracking area code may be a code for identifying a tracking area. In case of the tracking area identity of first tracking area 110 (i.e., "450/08/H'0001"), the identity denotes that a mobile country code is 450 which denotes Republic of Korea, the mobile network code is 08 which denotes Korea Telecom (KT) as a communication service provider, and the tracking area code is H'0001 which denotes first tracking area 110. As described, the tracking area identity is generated as the combination of MCC/MNC/TAC so the tracking area identity (TAI) is unique from other tracking area identities.

As shown in FIG. 2, each tracking area list is illustrated as including two tracking area identities, but the present invention is not limited thereto. For example, first tracking area list 210 includes the tracking area identities (i.e., 450/08/H'0001 and 450/08/H'0002) of first tracking area 110 and second tracking area 120. Furthermore, second tracking area list 220 includes the tracking area identities (i.e., 450/08/H'0002 and 450/08/H'0003) of second tracking area 120 and third tracking area 130.

As described, mobility management entity 600 may manage such femtocell TAL information each associated with respective user equipment in accordance with at least one embodiment of the present invention. For example, mobility management entity 600 may be regularly reported from user equipment 500 with information on a tracking area where user equipment 500 is located and update the TAL information associated with user equipment 500 based on the regularly reported information. That is, user equipment 500 receives a tracking area identity that is broadcasted from femtocell base station (i.e., femtocell base station 113) and reports the received tracking area identity to mobility management entity 600. Mobility management entity 600 maintains information on the latest received tracking area identity in connection with user equipment 500.

Mobility management entity 600 may perform the paging operation based on the TAL information, such as femtocell TAL information, associated with a target user equipment to be found. For example, when first tracking area 110 was reported to mobility management entity 600 as the latest tracking area that user equipment 500 is located, mobility management entity 600 transmits a paging message to all femtocell base stations included in first tracking area 110. Alternatively, mobility management entity 600 may perform the paging operation based on a related tracking area list. For example, when first tracking area list 210 is associated with user equipment 500, mobility management entity 600 may transmit a paging message to all femtocell base stations (i.e., femtocell base stations 111 to 113) in first tracking area 110 and second tracking area 120.

As described, the tracking area, the tracking area list, and the tracking area update were described based on femtocell network 100 with reference to FIG. 1 and FIG. 2. Such tracking area, tracking area list, and tracking area update are similarly applied to macrocell networks. Although a macrocell base station has a service area bigger than that of a femtocell base station, a macrocell network is also divided into tracking areas. Such tracking areas are used to find locations of user equipments in the macrocell network. Particularly, a mobility management entity transmits a paging message to macrocells included in a tracking area or a tracking area list associated with a target user equipment to find. In order to maintain such macrocell tracking areas, user equipments in the macrocell network perform a tracking area update procedure when a corresponding update timer elapses or when a user equipment enters a new tracking area not included in a tracking area list.

In accordance with at least one embodiment, information on such macrocell tracking areas may be also obtained and managed by a mobility management entity for a paging procedure in a femtocell network. Particularly, a mobility management entity may obtain information on macrocell tracking areas overlapping with femtocell tracking areas of a target user equipment in addition to the femtocell tracking areas that the target user equipment has visited or currently located therein. The information on macrocell tracking areas may be used to perform a paging procedure together with information on femtocell tracking areas. Accordingly, a probability of finding a target user equipment may increase in accordance with at least one embodiment of the present invention. Such tracking area management in a femtocell network in accordance with at least one embodiment of the present invention will be described with reference to FIG. 3 to FIG. 6.

Figures 3, 4:
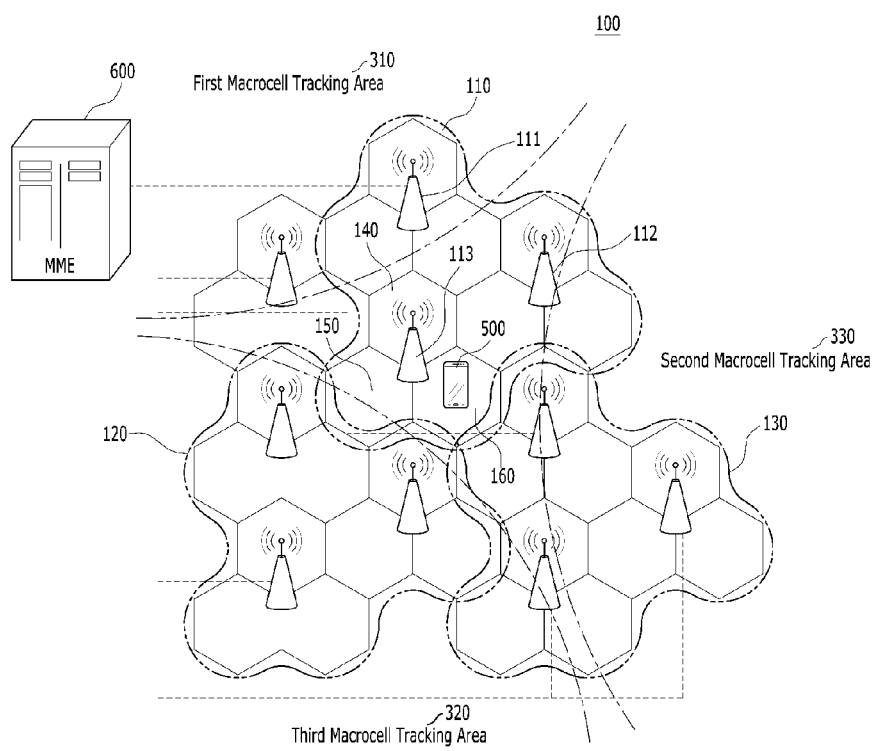
FIG. 3 shows macrocell tracking areas overlapping with femtocell tracking areas in accordance with at least one embodiment.
FIG. 4 shows tracking area list information stored in and managed by a mobile management entity for tracking area list management in a femtocell network in accordance with at least one embodiment.

FIG. 3 shows macrocell tracking areas overlapping with femtocell tracking areas in accordance with at least one embodiment of the present invention.

As described, a macrocell network is also divided into tracking areas for various purposes including a paging procedure. Such tracking areas in the macrocell network may be referred to a macrocell tracking area. Since a service area of a macrocell base station is wider than that of a femtocell base station, a macrocell tracking area is also wider than a femtocell tracking areas.

Referring to FIG. 3, macrocell tracking areas 310, 320, and 330 overlap with femtocell tracking areas 110, 120, and 130. For example, first femtocell tracking area 110 overlaps with three macrocell tracking areas 310, 320, and 330. Second femtocell tracking area 120 overlaps with one macrocell tracking area 320. Third femtocell tracking area 130 overlaps with two macrocell tracking areas 310 and 330.

In accordance with at least one embodiment, femtocell base stations 111, 112, and 113 regularly provide mobility management entity 600 with associated with macrocell information. The associated with macrocell information may be information on macrocell tracking areas overlapping femtocell tracking areas of each femtocell base station. Alternatively, the associated with macrocell information may be identification information of neighbor macrocell base stations of each femtocell base station. Such operation will be described in more detail with reference to FIG. 5 and FIG. 6.

As described, femtocell tracking areas overlap with macrocell tracking areas. In accordance with at least one embodiment, information on such overlapped macrocell tracking areas may be obtained, stored, and managed for a paging procedure in a femtocell network.

FIG. 4 shows tracking area list information stored in and managed by a mobile management entity for tracking area list management in a femtocell network in accordance with at least one embodiment of the present invention.

Referring to FIG. 4, tracking area list information in accordance with at least one embodiment of the present invention include not only femtocell tracking areas associated with registered user equipments but also macrocell tracking areas that overlap with the femtocell tracking areas. Particularly, a tracking area list associated with a respective user equipment include tracking area identities 430 of femtocell tracking areas associated with the respective user equipment and tracking area identifies 440 of macrocell tracking areas overlapping with the femtocell tracking areas.

For example, first tracking area list 410 includes two femtocell tracking area identities (i.e., 450/08/H'0001 450/08/H'0002) of first and second femtocell tracking areas 110 and 120 and three macrocell tracking area identities (i.e., 450/08/M'0001, 450/08/M'0002, 450/08/M'0003). That is, two femtocell tracking areas 110 and 120 associated with user equipment 500 overlap three macrocell tracking areas 310, 320, and 330. Accordingly, first tracking area list 410 include two femtocell tracking area identities 450/08/H'0001 and 450/08/H'0002 of two femtocell tracking areas 110 and 120 and three macrocell tracking area identities 450/08/M'0001, 450/08/M'0002, and 450/08/M'0003 of macrocell tracking areas 310 to 330 in accordance with at least one embodiment of the present invention.

Furthermore, second tracking area list 420 includes two femtocell tracking area identities and two macrocell tracking area identities. That is, the associated user equipment has visited or currently located in two femtocell tracking areas that overlap with two macrocell tracking areas. Accordingly, second tracking area list 420 include two femtocell tracking area identities 450/08/H'0002 and 450/08/H'0003 of femtocell tracking areas 120 and 130 and two macrocell tracking area identities 450/08/M'0002 and 450/08/M'0003 of macrocell tracking areas 320 and 330.

In accordance with at least one embodiment of the present invention, integrated tracking area list information, shown in FIG. 4, may be created and managed by a mobility management entity (i.e., mobility management entity 600). An operation of the mobility management entity for integrated tracking area management will be described with reference to FIG. 5 and FIG. 6.

Figure 5:
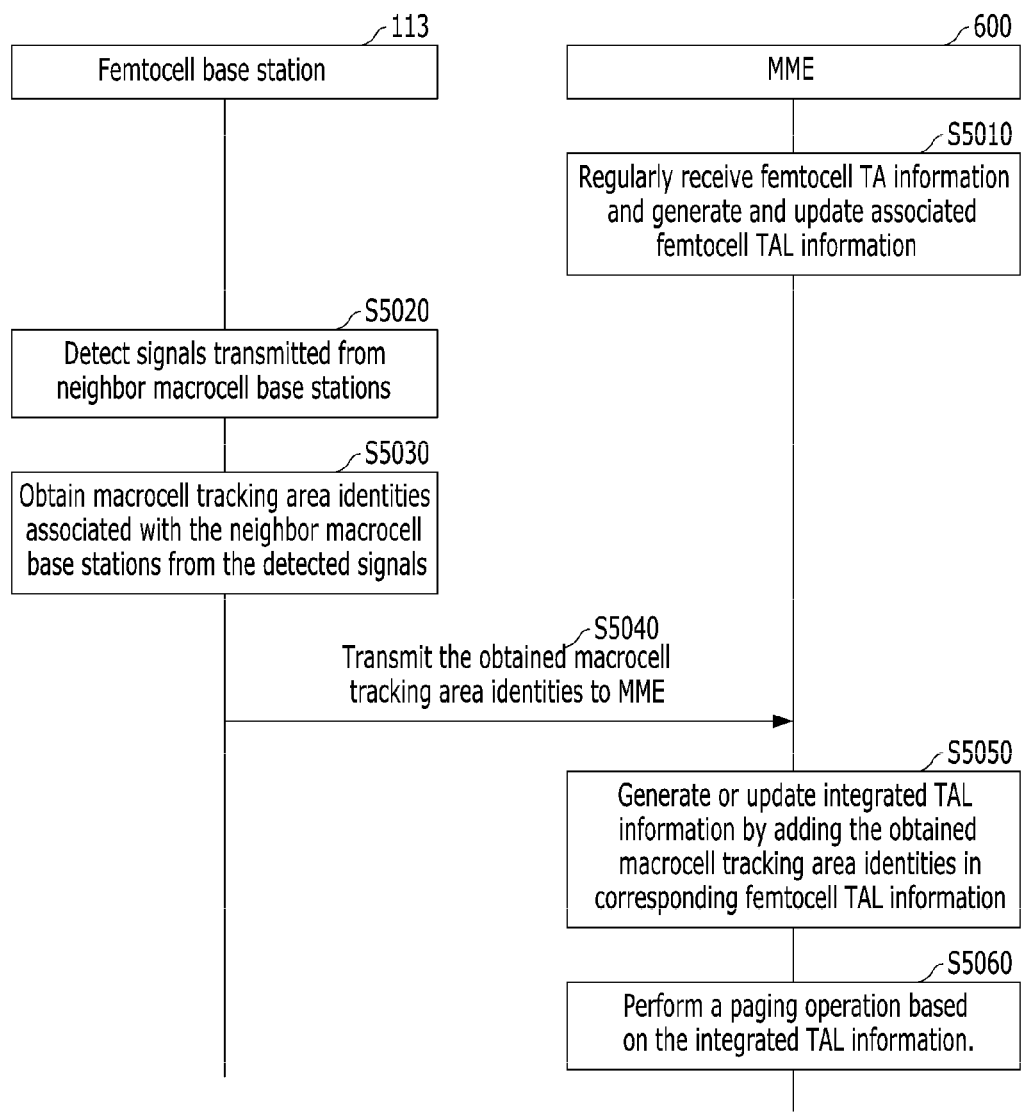
FIG. 5 illustrates integrated tracking area management in accordance with at least one embodiment.

FIG. 5 illustrates integrated tracking area management in accordance with at least one embodiment of the present invention.

Referring to FIG. 5, femtocell tracking area information may be regularly received and femtocell tracking area list information may be updated and managed according to respective user equipments at step S5010. For example, mobility management entity 600 receives information on femtocell tracking areas from registered user equipment 500 at a regular interval or upon entering of a new tracking area which is not included in an associated tracking area list. Mobility management entity 600 generates or updates a femtocell tracking area list associated with user equipment 500 based on the received information on the femtocell tracking areas. Since such operation was already described with reference to FIG. 1 and FIG. 2, the detailed description thereof is omitted herein.

As descried above, the femtocell tracking area list may be similar to that shown in FIG. 2. Such femtocell tracking area list may be integrated with an associated macrocell tracking area list in accordance with at least one embodiment of the present invention. That is, mobility management entity 600 may obtain information on macrocell tracking areas overlapping femtocell tracking areas included in a femtocell tracking area list and generate and manage integrated tracking area list (TAL) information by adding the macrocell tracking area information into the associated femtocell tracking area list information. Such operation will be described in detail hereinafter.

At step S5020, signals transmitted from neighbor macrocell base stations may be detected. For example, femtocell base stations 111 to 113 may detect signals transmitted from neighbor macrocell base stations at a predetermined interval or upon a predetermined event. Such predetermined event may be caused by a request message from a mobility management entity. Femtocell base stations 111 to 113 may perform a sniff operation for detecting a signal, but the present invention is not limited thereto.

Particularly, femtocell base station 111 may detect a signal transmitted from a macrocell base station located in first macrocell tracking area 310. Femtocell base station 112 may detect a signal transmitted from a macrocell base station located in second macrocell tracking area 320. Femtocell base station 113 may detect a signal transmitted from a macrocell base station located in third macrocell tracking area 330.

At step S5030, macrocell tracking area information may be obtained from the detected signals. As described, the macrocell tracking area information may include a macrocell tracking area identity. For example, femtocell base station 111 may obtain first macrocell tracking area information from the detected signal transmitted from the macrocell base station located in first macrocell tracking area 310. Such first macrocell tracking area information may include a first macrocell tracking area identity of first macrocell tracking area 310. Femtocell base station 112 may obtain second macrocell tracking area information from the detected signal transmitted from the macrocell base station located in second macrocell tracking area 320. Such second macrocell tracking area information may include a second macrocell tracking area identity of second macrocell tracking area 320. Femtocell base station 113 may obtain third macrocell tracking area information from the detected signal transmitted from the macrocell base station located in third macrocell tracking area 330. Such third macrocell tracking area information may include a third macrocell tracking area identity of second macrocell tracking area 320.

At step S5040, the obtained macrocell tracking area information may be transmitted to a mobility management entity. For example, femtocell base stations 111 to 113 may transmit the obtained first, second, and third macrocell tracking area information to mobility management entity 600. Femtocell base stations 111 to 113 may further transmit, to mobility management entity 600, own femtocell tracking area information together with the obtained macrocell tracking area information.

At step S5050, integrated tracking area list information may be generated or updated based on the obtained macrocell tracking area information. For example, mobility management entity 600 may receive the macrocell tracking area information from femtocell base stations 111 to 113. Based on the received macrocell tracking area information, mobility management entity 600 may generate or update integrated tracking area list information each associated with respective user equipments.

Particularly, mobility management entity 600 may receive the first, second, and third macrocell tracking area information from femtocell base stations 111 and 113. Mobility management entity 600 may generate or update integrated tracking area list information for user equipment 500 by combining the received first, second, and third macrocell tracking area information with the femtocell tracking area list information of user equipment 500. For example, when femtocell tracking area list information of user equipment 500 is first tracking area list information 210 of FIG. 2, mobility management entity 600 may generate integrated tracking area list information 410 of FIG. 4 by adding macrocell tracking area identities 440 included in the received first, second, and third macrocell tracking area information.

Mobility management entity 600 may refer the femtocell tracking area identities received from femtocell base stations 111 to 113 to combine the received first to third macrocell tracking area information with corresponding femtocell tracking area list information, such as tracking area lists 210 and 220 of FIG. 2. Furthermore, mobility management entity 600 may extract first to third macrocell tracking area identities respectively from the received first to third macrocell tracking area information and combine the extracted first to third macrocell tracking area identities with corresponding femtocell tracking area lists to generate or to update the integrated tracking area list information.

After generating and storing such integrated tracking area list information, a paging operation in a femtocell network may be performed based on the integrated tracking area list information at step S5060. For example, mobility management entity 600 may perform a paging operation for finding user equipment 500 in an idle mode because there is data traffic generated for user equipment 500. In this case, mobility management entity 600 may refer integrated tracking area list 410 of FIG. 4 for the paging operation. For example, mobility management entity 600 may control femtocell base stations and macrocell base stations located in femtocell tracking areas and macrocell tracking areas included in integrated tracking area list 410 of FIG. 4 to transmit a paging message in order to find a location of user equipment 500 in an idle mode in accordance with at least one embodiment of the present invention. Accordingly, a probability of finding a location of user equipment in an idle state may be improved.

As described in the steps S5020 to S5040, femtocell tracking area information was described as being extracted by femtocell base stations from the detected signals transmitted from neighbor macrocell base stations and transmitted to mobility management entity 600. The present invention, however, is not limited thereto. Such macrocell tracking area information may be obtained through various methods.

In accordance with another embodiment, a femtocell base station may obtain identification information (i.e., physical cell identity: PCI) of neighbor macrocell base stations through sniffing operation. Then, the femtocell base station may transmit the obtained identification information (i.e., PCI) of neighbor macrocell base stations with femtocell base station identification information (i.e., PCI of femtocell base station) to mobile management entity (i.e., 600). The mobile management entity obtains macrocell tracking area identities corresponding to the obtained macrocell PCIs and obtain femtocell tracking area identities corresponding to the obtained femtocell PCIs. Accordingly, the mobile management entity can obtain macrocell tracking area identities of macrocell tracking areas overlapping with femtocell tracking areas.

In accordance with further another embodiment, a mobile communication service provider may store coordinates of installation locations of femtocell base stations and macrocell base stations in a predetermined database. Such coordinates may be longitude and latitude of locations of femtocell and/or macrocell base stations. Furthermore, such coordinates may be addresses of locations of femtocell and/or macrocell base stations. Since femtocell and/or macrocell tracking areas may be combination of femtocells or macrocells within a predetermined radius at a certain location, macrocell tracking areas overlapping with femtocell track areas can be obtained using such a database. Such a database may be provided to the mobility management entity. In this case, the mobility management entity may generate the integrated tracking area list based on the provided database. In addition, the mobile management entity may receive information on macrocell tracking areas overlapping with femtocell tracking areas from the mobile communication service provider through a predetermined protocol.

As described above, mobile management entity 600 may regularly receive macrocell tracking area information from the femtocell base stations and generate and manage the integrated tracking area list information by adding the received macrocell tracking area information into corresponding femtocell tracking area list information in accordance with at least one embodiment of the present invention. Hereinafter, such mobile management entity 600 will be described in detail with reference to FIG. 6.

Figure 6:
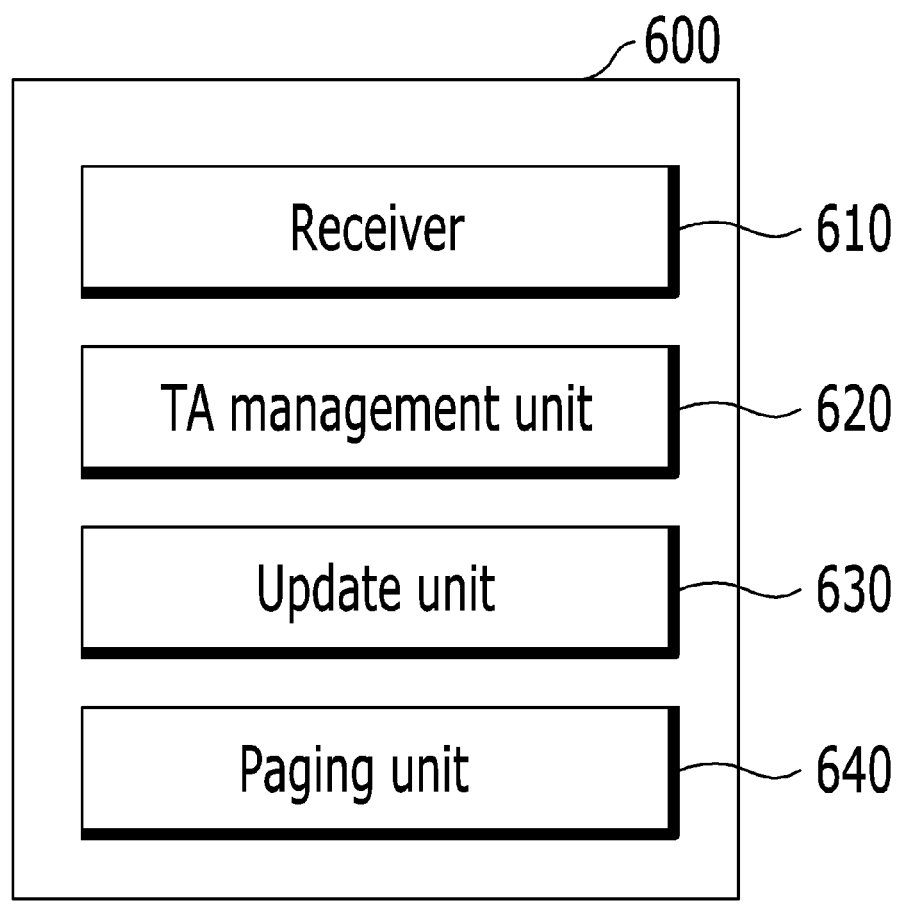
FIG. 6 shows a mobile management entity for performing integrated tracking area list management in accordance with at least one embodiment.

FIG. 6 shows a mobile management entity for performing integrated tracking area list management in accordance with at least one embodiment of the present invention.

Referring to FIG. 6, mobile management entity (MME) 600 may include receiver 610, tracking area (TA) management unit 620, update unit 630, and paging unit 640. Tracking area (TA) management unit 620 might be implemented as a TA management processor including one or more processor devices/logic, memory, program code, input/output (I/O) and related circuitry to implement the described functionality in a physical device. Update unit 630 might be implemented as a update processor including one or more processor devices/logic, memory, program code, input/output (I/O) and related circuitry to implement the described functionality in a physical device. Paging unit 640 might be implemented as a paging processor including one or more processor devices/logic, memory, program code, input/output (I/O) and related circuitry to implement the described functionality in a physical device.

Receiver 610 may receive information on macrocell tracking areas from femtocell base stations in accordance with at least one embodiment of the present invention. Such macrocell tracking area information may include information on macrocell tracking areas overlapping with femtocell tracking areas of the femtocell base stations. That is, the macrocell tracking area information may include macrocell tracking area identities of the overlapped macrocell tracking areas.

For example, receiver 610 may receive, from femtocell base station 111, tracking area identities of first to third macrocell tracking areas 310 to 330 overlapping femtocell tracking areas 110 of femtocell base station 111. Receiver 610 may also receive a femtocell tracking area identity of femtocell base station 111 with the macrocell tracking area information. Such macrocell tracking area information may be obtained through detecting signals transmitted from neighbor macrocell base stations as described above. Such detection may be a sniffing operation.

Alternatively, receiver 610 may receive identification information of femtocell base stations and identification information of macrocell base stations located in tracking areas overlapping with femtocell tracking areas in accordance with another embodiment of the present invention. The identification information may be a physical cell identity (PCI) of a femtocell base station or a macrocell base station. Femtocell tracking area list information and macrocell tracking area list information may be obtained from the received identification information (i.e., PCIs of the femtocell base station and the macrocell base station). In this case, femtocell base stations 111 to 113 may detect signals transmitted from neighbor macrocell stations and obtain PCIs of the macrocell base stations from the detected signals.

Tracking area (TA) management unit 620 may manage integrated tracking area list information each associated with respective user equipments registered at mobility management entity 600 in accordance with at least one embodiment of the present invention. For example, TA management unit 220 may store and manage integrated tracking area list information shown in FIG. 4.

Particularly, TA management unit 620 may manage femtocell tracking area lists of respective user equipments. As shown in FIG. 4, each femtocell tracking area list 430 may include femtocell tracking area identities of femtocell tracking areas that a corresponding user equipment has visited or is currently located in. Based on such information, TA management unit 620 may be aware of which femtocell is included which tracking area and which tracking area is included which tracking area list. Such information may be stored in a memory (not shown) of mobility management unit 600.

Furthermore, TA management unit 620 may manage information on macrocell tracking areas which overlap femtocell tracking areas in associated femtocell tracking area lists in accordance with at least one embodiment of the present invention. For example, TA management unit 620 may add such macrocell tracking area list information 440 to femtocell tracking area list information 430 as shown in FIG. 4. Particularly, TA management unit 620 may add macrocell tracking area identities included in the received macrocell tracking area information into corresponding femtocell tracking area list, thereby generating integrated tracking area lists.

For example, TA management unit 620 may, from the received macrocell information, extract at least one tracking area identity of a macrocell tracking area that overlaps a femtocell tracking area of the femtocell base station. TA management unit 620 may generate an integrated tracking area list by adding the extracted at least one tracking area identity of the overlapped macrocell tracking area into a tracking area list associated with the femtocell base station.

For another example, TA management unit 620 may extract a physical cell identity (PCI) of at least one neighbor macrocell base station from the received macrocell information. Based on the PCI, TA management unit 620 may obtain a tracking area identity of a macrocell tracking area associated with the at least one neighbor macrocell. TA management unit 620 may retrieve femtocell tracking area information of the femtocell base station and obtain at least one femtocell tracking area list based on the retrieved femtocell tracking area information of the femtocell base station. The at least one femtocell tracking area list may include tracking area identities of femtocell tracking areas that a corresponding user equipment has visited or currently located. TA management unit 620 may add the obtained tracking area identity of the macrocell tracking area into the obtained at least one femtocell tracking area list as the integrated tracking area list.

Update unit 630 may perform a tracking area update operation. Particularly, update unit 630 may receive a tracking area update request message from user equipment 500. The tracking area update request message may be transmitted when a tracking area update timer is expired or when user equipment enters a new tracking area. In response to the tracking area update request message, update unit 630 may obtain information (i.e., tracking area identity) on the last tracking area where user equipment is currently located. Then, update unit 630 may transmit a tracking area update accept message to user equipment 500.

Furthermore, update unit 630 may transmit the integrated tracking area list to a user equipment. The integrated tracking area list may be a tracking area list where the user equipment is belonging to. The new tracking area list may be an integrated tracking area list that includes not only femtocell tracking area list but also macrocell base stations.

Paging unit 640 may perform a paging operation. Such paging operation may be performed based on the integrated tracking area list in accordance with at least one embodiment of the present invention. Particularly, paging unit 640 may transmit a paging signal to femtocell base stations included in the latest tracking area and macrocell base stations located in overlapped macrocell tracking areas based on the integrated tracking area list. Alternatively, paging unit 640 may transmit a paging signal to all femtocell base stations and macrocell base station located at femtocell and macrocell tracking areas included in the integrated tracking area list.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of tracking area management in a femtocell network at a mobility management entity, the method comprising:
   receiving, from a plurality of femtocell base stations, physical cell identities (PCI) of neighbor macrocell base stations of each one of the femtocell base stations as macrocell tracking area information associated with each one of the femtocell base stations;
   generating an integrated tracking area list by extracting, based on the PCIs of neighbor macrocell base stations, at least one tracking area identity of a macrocell tracking area overlapping a femtocell tracking area of respective femtocell base station, and adding the extracted at least one tracking area identity of the overlapped macrocell tracking area into a tracking area list associated with the respective femtocell base station;
   storing and managing the generated integrated tracking area information; and
   controlling femtocell base stations and macrocell base station, which are only included in the integrated tracking area list, to transmit a paging message to associated user equipments for finding user equipments in an idle mode.

2. The method of claim 1, wherein the macrocell tracking area information is information on macrocell tracking areas overlapping femtocell tracking areas of the femtocell base station.

3. The method of claim 1, wherein the macrocell tracking area information includes tracking area identities of macrocell tracking areas associated with the femtocell base station.

4. The method of claim 1, wherein each one of the femtocell base stations detects signals from neighbor macrocell base stations, obtains information on macrocell tracking areas of the neighbor macrocell base stations from the detected signals, and provides the obtained information as the macrocell tracking area information to the mobility management entity.

5. The method of claim 4, wherein each one of the femtocell base stations performs a sniffing operation for detecting the signals from the neighbor macrocell base station.

6. The method of claim 1, wherein the femtocell tracking area information is previously generated and managed at the mobility management entity by regularly receiving information on femtocell tracking areas associated with the femtocell base station.

7. The method of claim 1, comprising:
   receiving a tracking area update request from a user equipment; and
   providing to the user equipment with associated integrated tracking area information having information on macrocell tracking areas overlapping femtocell tracking areas that the user equipment has visited and is currently located.

8. A method of tracking area list management in a femtocell network at a mobility management entity, the method comprising:
   receiving, from a femtocell base station, a physical cell identity (PCI) of at least one neighbor macrocell base station in vicinity of the femtocell base station;
   obtaining a tracking area identity of a macrocell tracking area associated with the at least one neighbor macrocell base station based on the received PCI;
   retrieving femtocell tracking area information of the femtocell base station;
   generating integrated tracking area information by combining the obtained macrocell tracking area identity with the retrieved femtocell tracking area information; and
   performing a paging procedure by controlling femtocell base station and macrocell base stations, which are only included in the integrated tracking area information, to transmit a paging message to associated user equipments for finding user equipments in an idle mode.

9. The method of claim 8, wherein the retrieving includes:
   obtaining at least one femtocell tracking area list based on the retrieved femtocell tracking area information of the femtocell base station, where the at least one femtocell tracking area list includes tracking area identities of femtocell tracking areas that a corresponding user equipment has visited or currently located.

10. The method of claim 9, wherein the generating includes:
    adding the obtained tracking area identity of the macrocell tracking area into the obtained at least one femtocell tracking area list; and
    storing the at least one femtocell tracking area list with the obtained tracking area identity added as the integrated tracking area list.

11. A mobility management entity comprising:
    a receiver configured to receive, from a femtocell base station, a physical cell identity (PCI) of at least one neighbor macrocell of the femtocell base station;
    a tracking area management processor configured to i) obtain a tracking area identity of a macrocell tracking area associated with the at least one neighbor macrocell base station based on the received PCI, ii) retrieve femtocell tracking area information of the femtocell base station, iii) obtain at least one femtocell tracking area list based on the retrieved femtocell tracking area information of the femtocell base station, where the at least one femtocell tracking area list includes tracking area identities of femtocell tracking areas that a corresponding user equipment is at least one of previously and currently located, and iv) generate integrated tracking area information by adding the obtained tracking area identity of the macrocell tracking area into the obtained at least one femtocell tracking area list; and a paging processor configured to control femtocell base stations and macrocell base stations, which are only included in the generated integrated tracking area information, to transmit a paging message to associated user equipment for finding user equipment in an idle mode.

12. The mobility management entity of claim 11, wherein:
the femtocell base station detects signals from neighbor macrocell base stations, obtains information on macrocell tracking areas of the neighbor macrocell base stations from the detected signals, and provides the obtained information as the macrocell information to the mobility management entity; and the macrocell information is information on macrocell tracking areas overlapping femtocell tracking areas of the femtocell base station and includes tracking area identities of the overlapped macrocell tracking areas.

13. The mobility management entity of claim 11, wherein the tracking area management processor is configured to:
extract, from the received macrocell information, at least one tracking area identity of a macrocell tracking area overlapping a femtocell tracking area of the femtocell base station;

add the extracted at least one tracking area identity of the overlapped macrocell tracking area into a tracking area list associated with the femtocell base station; and store the tracking area list with the tracking area identity of the overlapped macrocell tracking area as an integrated tracking area list.

* * * * *